J. O'D. SHEPHERD.
GEAR SHIFT.
APPLICATION FILED AUG. 13, 1919.
1,360,035.
Patented Nov. 23, 1920.
3 SHEETS—SHEET 2.
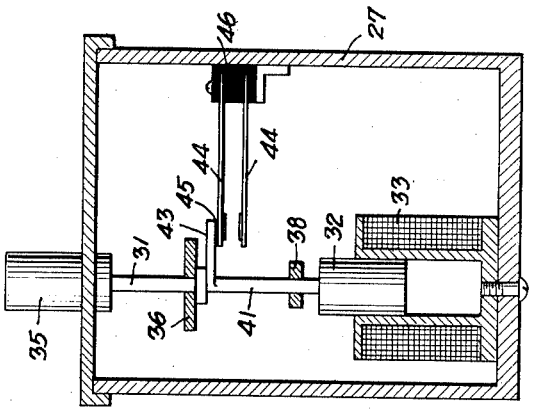
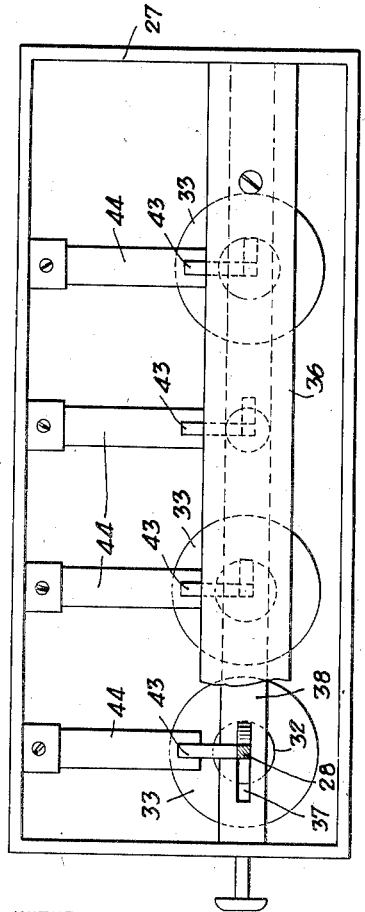
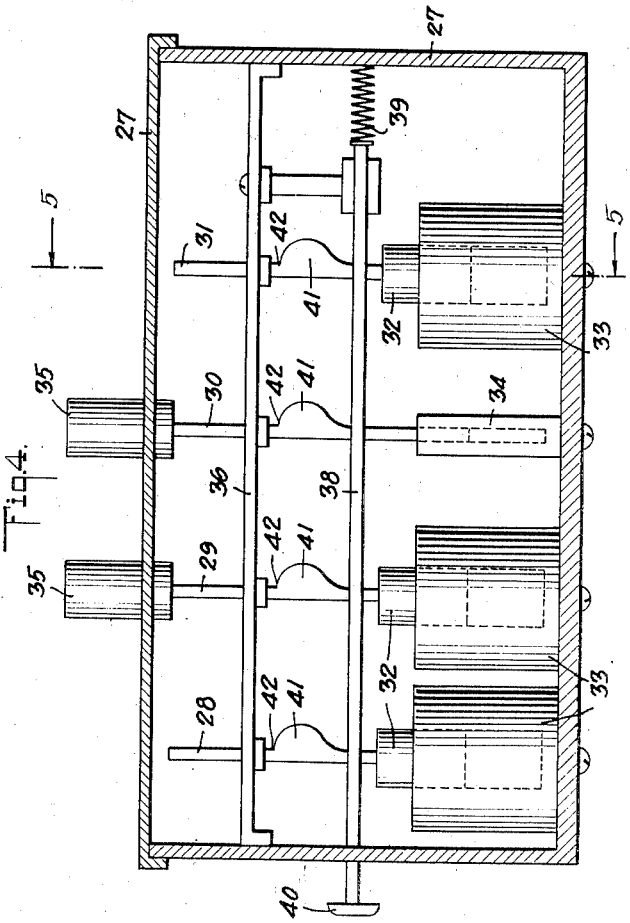
WITNESSES
INVENTOR
Judson O. Shepherd
BY
ATTORNEYS

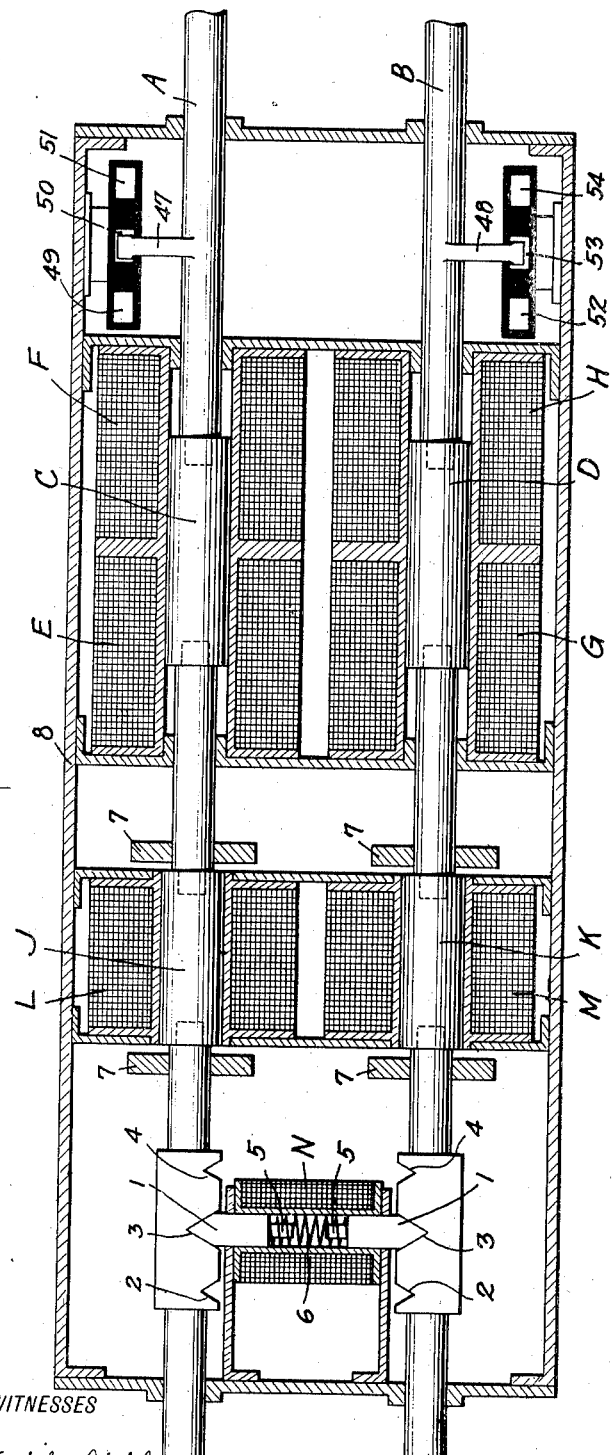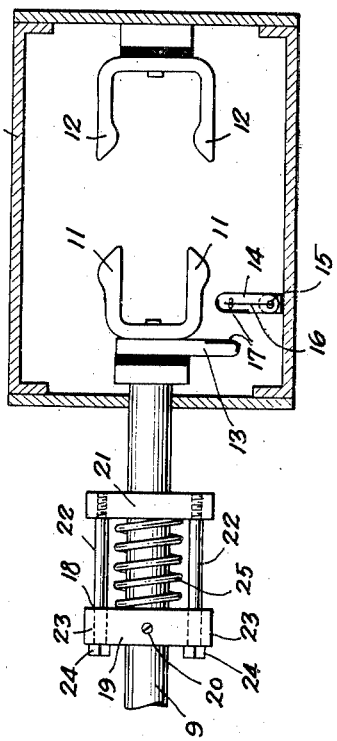

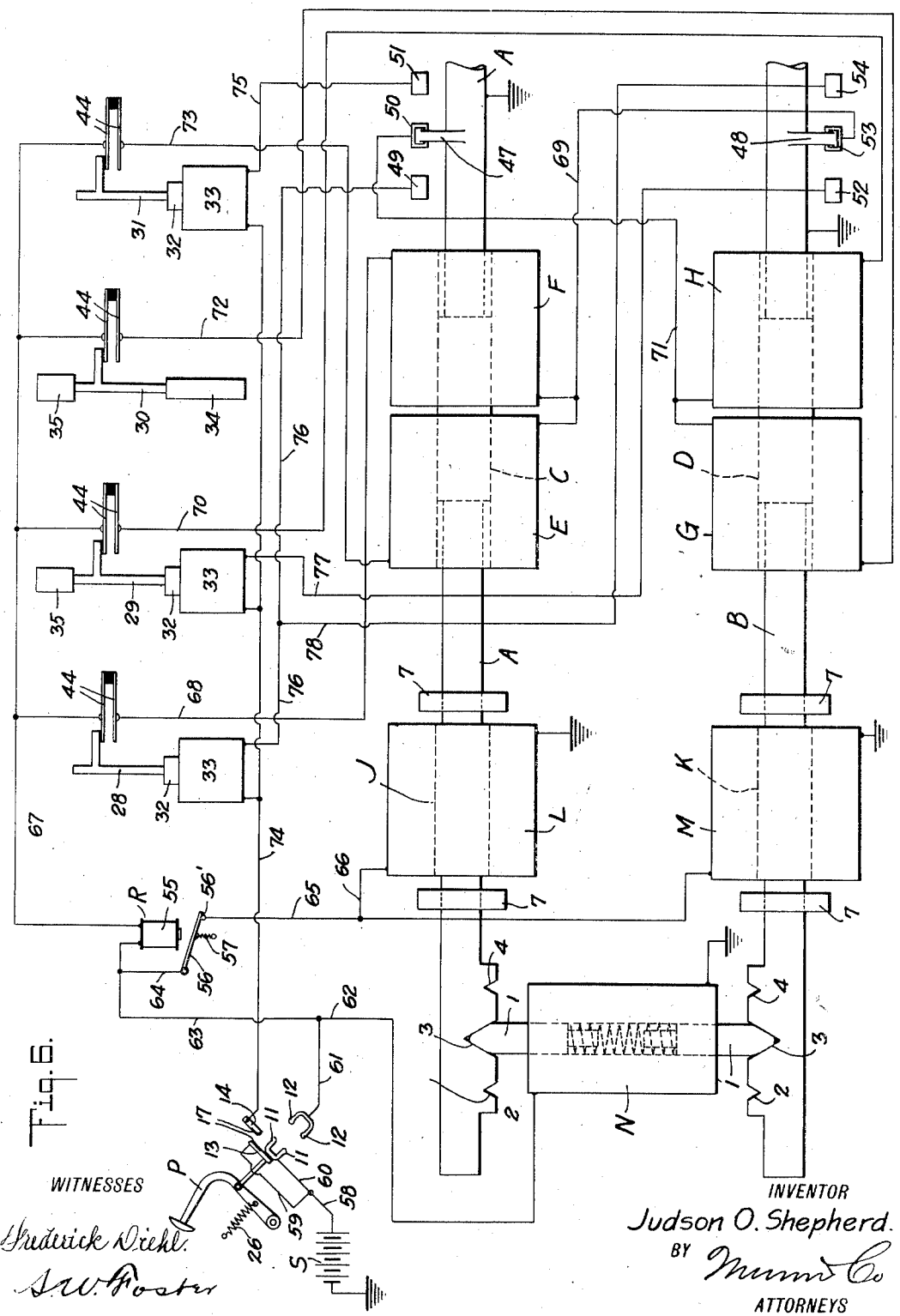

UNITED STATES PATENT OFFICE.

JUDSON O'DONALD SHEPHERD, OF ATLANTA, GEORGIA.

GEAR-SHIFT.

1,360,035.            Specification of Letters Patent.    Patented Nov. 23, 1920.

Application filed August 13, 1919. Serial No. 317,218.

*To whom it may concern:*

Be it known that I, JUDSON O'DONALD SHEPHERD, a citizen of the United States, and a resident of Atlanta, in the county of Fulton and State of Georgia, have invented a new and Improved Gear-Shift, of which the following is a full, clear, and exact description.

This invention relates to improvements in gear shifts, and more particularly to an electrically operated gear shift in which the shifting in sequence or progression is automatic but capable of alteration in the progression by manually operated controlling means, an object of the invention being to provide an electrically operated gear shift which will be, to a large extent, automatic, causing the gears to shift in the normal progression thereof, the initial operation being brought about by a manually operated clutch lever which closes the necessary electric circuit or circuits.

A further object is to provide an improved construction and arrangement of solenoids operating a pair of gear sliders, the latter independently movable and controlling the shift of the gears for the automobile.

A further object is to provide an improved construction and arrangement of selective devices, some of which are manually operated to control the gear shift, others being operated automatically in regular sequence, which are capable of operation one at a time only whereby the movement of one selective device causes the release of the others.

A further object is to provide an improved electrically operated mechanism which prevents the possibility of the gear sliders from moving at the same time.

With automobiles in general use the sequence of speeds is almost always the same, that is, the automobile is started off by going into "first," then into "second," and then into "third." From "third," the usual operation is to go back into "second," and again go into "third." This sequence is not invariable as it is sometimes desirable to go into "neutral" first, or "reverse" from any of these positions. It is the object of my invention to provide an apparatus in which the normal sequence is automatic, and in which the unusual sequence can be brought about by manually operative selective devices.

With these and other objects in view, the invention consists in certain novel features of construction and combinations and arrangements of parts as will be more fully hereinafter described and pointed out in the claims.

In the accompanying drawings—

Figure 1 is a view in longitudinal section illustrating my improved arrangement of solenoids controlling the movements of the gear sliders;

Fig. 2 is an enlarged view partly in elevation and partly in section, illustrating the electrical contacts operated by the clutch lever;

Fig. 3 is a plan view of the switches which constitute my improved selective devices, the cover of the box being removed and portions broken away for clearness of illustration;

Fig. 4 is a view in longitudinal vertical section illustrating my improved selective devices; in this view the cover of the box is in position and the switches or selective devices are in elevation;

Fig. 5 is a view in transverse section on the line 5—5 of Fig. 4;

Fig. 6 is an electric diagram which may be employed in connection with my improved apparatus.

A and B represent a pair of parallel rods which are designed to shift the gears (not shown) of an automobile, and these rods shall be hereinafter referred to as gear sliders. The rods A and B are mounted in a suitable casing 8, so that they slide freely in both direction.

The gear sliders A and B are provided with armatures C and D, respectively, the armature C being movable within a pair of solenoids E and F, to cause the gear slider A to move longitudinally in opposite directions. The armature D is movable within a pair of solenoids G and H, which move the gear slider B longitudinally. The gear sliders A and B are also provided with armatures J and K, respectively, movable within solenoids L and M, respectively. These solenoids L and M operate to move the shifters A and B to a neutral position. A solenoid N is located within the casing 8 and operates a pair of dogs 1—1, which constitute armatures and have outwardly beveled ends adapted to engage in any of a series of notches 2, 3 and 4 in the gear sliders A and B to hold the sliders in any position of adjustment. These dogs 1—1 have reduced inner ends 5 seating within a coil spring 6, the latter serving to force the dogs apart and into engagement with the gear sliders A and B. These dogs are of such a combined length that it is impossible to release but a single gear slider at an operation so that the possibility of both gear sliders moving at the same time is entirely obviated. To increase the power and effectiveness of the solenoids L and M, I may locate soft iron washers 7 on the gear sliders at opposite ends of the solenoids, as clearly shown in Fig. 1.

10 represents a box which is located adjacent the clutch lever P. A rod 9 connected to the clutch lever P projects into the box 10, and is provided with a horseshoe contact 11 adapted to engage a similar contact 12 fixed in the box. The rod 9 also carries a contact 13 which is in the form of a fixed arm projecting laterally therefrom, and this contact 13 engages a pivoted contact 14 connected to the box 10, as shown at 15. A spring 16 normally holds the contact 14 at right angles to the wall of the box, and insulation 17 is located on the contacts 13 and 14, so that no circuit is closed when the contact 13 moves in one direction which would be to the right of Fig. 1, but on the opposite movement or return movement of the contact 13, the electric circuit is momentarily closed.

During the ordinary or normal operation of the clutch lever P, the contacts 11 and 12 are not brought together so that it requires and extra or unusual movement to bring the contacts together. To prevent the accidental closing of the circuits, a resistance device is located on the rod 9, and comprises a bar 19 secured to the rod 9 by means of a screw 20. A second bar 21 is mounted to slide on the rod 9, and parallel rods 22 are fixed to bar 21 and movable in openings 23 in the bar 19, said rods 22 having heads 24 at their free ends normally engaging the bar 19. A coil spring 25 is positioned around the rod 9 between the bars 19 and 21.

During the normal or ordinary action, the spring 25 is not compressed, but when it is desired to close the electric circuit, it is necessary to impart an extreme movement to the clutch lever, which brings the bar 21 against the box 10 and necessitates the compression of the spring 25, so that the operator realizes what he is about and cannot inadvertently close the switches. A coil spring 26 is illustrated, holding the clutch lever P in normal position and returning the same to such position when released.

In Figs. 3, 4 and 5, my improved selective devices are illustrated and will now be described in detail:

A box or casing 27 is provided and will be conveniently located on the automobile. In this box 27, four switches 28, 29, 30 and 31, respectively, are located. These switches are mounted to move vertically and three of them, namely, switches 28, 29 and 31, are provided at their lower ends with armatures 32, which are movable vertically by means of solenoids 33. The other switch, 30, has no solenoid, and is provided with a guide standard 34, as shown. Two of the switches, namely, switches 29 and 30, are provided with push buttons 35 projecting through the box and adapted to be manually operated. All of the switches 28, 29, 30 and 31 are guided in their longitudinal movement by means of a guide bar 36 secured in the box 27, and are movable through longitudinal slots 37 in a push bar 38. This push bar is held in its normal position by means of a coil spring 39 located within the box, and a push button 40 is provided on the outer end of the bar 38 to permit its manual operation. Each of the switches 28, 29, 30 and 31 is provided with a cam enlargement 41, which is movable through the slot 37 and engages the end wall of the slot so that the longitudinal movement of the switch in one direction causes the bar 38 to be moved longitudinally, which would be to the right of Fig. 4. Each cam enlargement 41 is provided with a shoulder 42 at its upper edge, which engages under the bar 38 after the cam enlargement 41 has passed through the slot, as the spring 39 will cause the bar 38 to move to the left of Fig. 4, and thereby hold the switch in its lowered position until a second switch is operated. When the second switch is operated, this cam enlargement 41 will move the bar 38 to the right, and in doing so, will release the switch first operated, allowing it to be returned to its former position.

While, of course, I might employ various means for returning the switches to normal position, I have illustrated in Fig. 5, a form of electric contact which has sufficient elasticity or spring force to move the switch back to normal position. Each switch is made with a laterally-projecting finger 43, engaging one of a pair of spring contacts 44, the contacts 44 being normally apart and suitable insulation 45 is located between the finger 43 and the upper contact 44, as shown. A block of insulation 46 supports the contacts 44 and holds them apart and insulated from each other.

It is to be understood that the gear sliders A and B are of non-magnetic metal so that the several solenoids may properly move the armatures on the gear sliders. The gear slider A is provided with a brush 47 adapted to engage any of a series of contacts, which I shall hereinafter refer to as segments 49, 50 and 51, respectively. The gear slider B is provided with a brush 48 adapted to engage any of a series of segments 52, 53 and 54, respectively, it being understood as clearly illustrated, that these several contacts or segments are insulated from each other and from the ground.

In the electric diagram shown in Fig. 6, the battery or source of electricity S is illustrated, having one side thereof grounded and the other side connected by wire 58 and branches 59 and 60 with the contact 13 and contacts 11, respectively. The contacts 12 and 14 are connected by wires 61 and 74, respectively, with the various electric devices above describel, as will now be explained. A slow-acting circuit breaker R is employed which may constitute a magnet 55 operating a switch arm 56 held in normal circuit-closing position by means of a spring 57. A wire 62 connects wire 61 with solenoid N, the solenoid at its opposite end being grounded.

A wire 63 is connected to one pole of the magnet 55 and also connected by branch 64 to the switch arm 56, said switch arm normally engaging a contact 56', connected by wire 65 to solenoid M, the other side of the solenoid being grounded.

The branch 66 connects wire 65 with solenoid L, the other end of the solenoid being grounded.

The magnet 55 is connected by a wire 67 with all four of the upper members of the electric contacts 44. The lower member of the contacts 44 operated by the switch 28 is connected by a wire 68 with one end of the solenoid F, the other end of the solenoid F being connected by a wire 69 with segment 53.

The lower contact member 44 of the switch 29 is connected by a wire 70 with one end of solenoid H, the other end of the solenoid being connected by a wire 71 with segment 50.

The lower contact member 44 of switch 30 is connected by a wire 72 to solenoid G, the other end of the solenoid connected by wire 71 to contact 50.

The lower member 44 of switch 31 is connected by a wire 73 with one end of solenoid E, the other end of the solenoid connected by the wire 69 with contact 53.

The wire 74 above referred to, which is connected to the contact 14, is connected to one pole of each of the solenoids 33. The second pole of the solenoid 33 for switch 28 is connected by wire 76 with segment 49. The second pole of the solenoid 33 for switch 29 is connected by a wire 77 with the segment 52. The second pole of the solenoid 33 for switch 31 is connected by a wire 75 with the segment 51.

The gear sliders A and B are grounded as are also solenoids L, M and N and the battery S, as above indicated.

The operation of my improvements is as follows, and particular attention is directed to the electric diagram, Fig. 6, above described:

Supposing the parts to be in "neutral" position as illustrated and it is desired to start the automobile, the clutch lever P is moved far enough to bring the contacts 11 and 12 together, and, as above explained, during this movement, the circuit is not closed by the contacts 13 and 14, due to the insulation 17 thereon. Previous to this movement of the clutch lever, the switch 29 is moved by means of its push button so as to bring its contacts 44 together, the switch being held in this circuit-closing position by means of the push bar 38, as above explained. As soon as the contacts 11 and 12 close the circuit, the solenoid N will be energized to cause an initial movement of the dogs 1 and release one of the gear sliders. As above pointed out, these dogs are of a combined length which will permit of a single gear slider to be released at a time.

When the contacts 11 and 12 are together, the circuit is from the battery S, through wires 58, 61, contacts 11, 12, and wires 61 and 62, to energize the solenoid N. The circuit is also made through the wire 63, and magnet 55 to move the contact arm 56 and open the circuit through wire 65 to the solenoids L and M. From magnet 55, the circuit includes wire 67, the contacts 44 of switch 29, wire 70, solenoid H, wire 71, contact segment 50, brush 47, gear slider A, to the ground. This energizing of the solenoid H will move the gear slider B to the right of Fig. 6, bringing the brush 48 into contact with segment 54.

When the clutch lever P is released, the spring 26 will return it to normal position, and during this return movement of the clutch lever, the contacts 13 and 14 will be momentarily brought together so that a circuit from the battery S will be established through the wire 74, the solenoid 33 of switch 28 pulling down the switch 28, and as explained, causes the release of the switch 29, allowing the latter to move upwardly and separate its contacts.

The circuit is now closed through the solenoid F, through the wires 68 and 69 to the segment 53, but as the brush 48 is on segment 54, the circuit is not established until the contacts 11 and 12 are again brought together, to first energize the solenoid N, through the wires 63, 64, switch arm 56 and wire 65, to bring the gear slider A back to its former position with the brush 48 on segment 53.

As soon as this is accomplished, the circuit is completed through the solenoid F, to draw the gear slider A to the right, with the brush 47 on segment 51, which is the second position. On the return movement of the contact 11, the contacts 13 and 14 are brought together and the solenoid 33 of the switch 31 is energized to close the contacts 44 of said switch 31 releasing the switch 28.

When the clutch lever is again operated, the solenoid L will be first energized to draw back the gear slider A back to neutral position, and then solenoid E will be energized through the circuit formed by wires 61, 63, 67, 73, 69, segment 53, brush 48, gear slider B, to the ground. This energizing of the solenoid E will move the gear slider A to the left, so that brush 47 will engage segment 49 and the device will be in the third position.

On the outward movement of the clutch lever P, the contacts 13 and 14 will close the circuit to energize the solenoid 33 of switch 28, closing the contacts 44 of said switch so that a circuit will be partially established with solenoid F, and the next operation of the clutch lever will move the gear slider A into second position. Hence, each continuing operation of the clutch lever will throw the gears from third speed into second speed, and then back into third again.

When it is desired to "reverse," it is necessary to manually operate the switch 30, which controls solenoid G, the circuit is established through wires 67, 72, solenoid G, wire 71, segment 50, brush 48, gear slider A, to the ground. From "reverse" the gears are moved back into "first."

It is to be understood, of course, that the initial operation is first to energize the solenoids L and M, bringing the gear sliders to neutral position, which establishes the circuits through the segments 50 or 53, then permitting the energizing of the selective solenoid, E, F, G or H. At any time all of the switches can be released by pushing in the slider bar 48, by means of the button 40, and the shifting gears can be controlled at will. It will therefore be noted that by my improvements, the operation of the clutch lever serves to close the necessary circuits to energize the proper solenoids and allow the parts to operate in regular ordinary sequence, which sequence may be varied by the manual operation of the switches 29 and 30, as above explained.

It is obvious that my improvements may be utilized in connection with any suitable manually operated means for moving the gear sliders so that in the event of any breaking down of the automatic mechanism, the sliders can be manually controlled.

It will be noted that the notches 3, 3 are appreciably deeper than notches 2 and 4, which allows one gear slider to move only when the other is in neutral position.

The gear shift described is for a transmission having three speeds forward. The the fourth speed transmission would have the same progression but there would be a button to be manually operated to secure a change from "third" to "fourth."

This button would be of the same type as 30. When the car is in "fourth" the progression will have caused button 31 to have been pulled down so that the shift will be prepared to go into "third," and thence into "second." Means for operation to be similar to those already employed.

Various slight changes might be made in the general form and arrangement of the parts described without departing from my invention, and hence I do not limit myself to the precise details set forth but consider myself at liberty to make such changes and alterations as fairly fall within the spirit and scope of the appended claims.

Having thus described the invention, what is claimed is:

1. A gear shift comprising gear-moving members, armatures on the gear-moving members, and solenoids controlling the armatures, a source of electricity, and said movable members in their different positions controlling the circuits to the solenoids to cause a shifting of the gears in progression when said operation is manually instigated.

2. A gear shift comprising gear-moving members, armatures on the gear-moving members, solenoids controlling the armatures, a source of electricity and said movable members in their different positions controlling the circuits to the solenoids to cause a shifting of the gears in progression when said operation is manually instigated, and a clutch lever operating to close the electric circuit including said members and solenoids together with selective devices included in the circuits with the solenoids.

3. A gear shift comprising gear-moving members, armatures on said members, and solenoids controlling the armatures and adapted to move the said members into different positions to cause a shifting of the gears in progession, other armatures on the gear-moving members, other solenoids controlling the last-mentioned armatures and adapted to move the members into neutral position, a source of electricity, and selective devices included in the circuits between the source of electricity and the first-mentioned circuits, the last-mentioned solenoids being momentarily included in all of the circuits by means of a slow-acting circuit breaker.

4. A gear shift comprising gear-moving members, electrically operated means for moving said members to cause a shifting of the gears in progression, selective devices controlling the operation of the electrically operated means, said members having notches therein conforming in number to the number of different positions of the members, and electrically operated dogs in said notches.

5. A gear shift comprising gear-moving members, electrically operated means for moving said members, selective devices controlling the operation of the electrically operated means, said members having notches therein conforming in number to the number of different positions of the members, a solenoid, a pair of armatures in the solenoid constituting dogs engaging the notches of the members, and a spring normally holding the dogs in the notches, said dogs being of a combined length greater than the distance between the members, whereby the release of but a single member at a time is permitted, said last-mentioned solenoid included momentarily in the circuits with all of the other solenoids.

6. A gear shift comprising gear-moving members, electrically operated devices for moving said members to cause a shifting of the gears in progression, a plurality of switches controlling the circuits between said devices and the source of electricity, and means compelling the release of each switch when a second switch is operated.

7. A gear shift comprising gear-moving members, electrically operated devices for moving said member to cause a shifting of the gears in progression, a plurality of switches controlling the circuits between said devices and the source of electricity, a push bar having slots therein receiving all of the switches, cam enlargements on the switches movable in the slots and causing the longitudinal movement of the push bar when any switch is moved to close a circuit, said cam enlargements having shoulders thereon, and a spring exerting pressure on the push bar moving the same into engagement with the shoulder of the switch after the latter has been operated, holding the switch in operative position, and said push bar released from said holding engagement by the movement of the cam enlargement of a second switch.

8. A gear shift comprising gear-moving members, electrically operated devices for moving said members to cause a shifting of the gears in progression, a plurality of switches controlling the circuits between said devices and the source of electricity, solenoids electrically operating certain of said switches, manually operated push buttons or others of said switches, and means permitting but a single switch to operate at a time.

9. A gear shift comprising gear-moving members, electrically operated devices for moving said members to cause a shifting of the gears in progression, a plurality of switches controlling the circuits between said devices and the source of electricity, solenoids electrically operating certain of said switches, manually operated push buttons on others of said switches, means permitting but a single switch to operate at a time, and a manually-operated member for releasing all of said switches from operative position.

10. A gear shift comprising gear-moving members, electrically operated devices for moving said members, a plurality of switches controlling the circuits between said devices and the source of electricity, solenoids electrically operating certain of said switches, manually operated push buttons on others of said switches, means permitting but a single switch to operate at a time, and pairs of spring contacts adapted to be moved together by the switches, said spring contacts adapted to move the switches in the opposite direction to open a switch when permitted.

11. A gear shift comprising gear-moving members, electrically operated devices for moving said members, a plurality of switches controlling the circuits between said devices and the source of electricity, solenoids electrically operating certain of said switches, manually operated push buttons on others of said switches, means permitting but a single switch to operate at a time, a manually operated member for releasing all of said switches from operative position, and pairs of spring contacts adapted to be moved together by the switches, said spring contacts adapted to move the switches in the opposite directions to open a switch when permitted.

12. A gear shift comprising gear-moving members, electrically operated means controlling the movement of the members to cause a shifting of the gears in progression, electrically operated means adapted to move the same into neutral position, electrically operated means permitting the movement of but a single member at a time, a clutch lever, a source of electricity, and contacts operated by the clutch lever for closing the circuits to the several electrically operated means.

13. A gear shift comprising gear-moving members, electrically controlled devices for moving said members, a clutch lever, two pairs of contacts controlled by the movement of the clutch lever, one pair of contacts brought together during the movement of the clutch lever in one direction and the other during the movement of the clutch lever in the opposite direction, a source of electricity, and selective devices included in the circuits between said pairs of contacts and said source of electricity, and the electrically controlled devices whereby the movement of the clutch lever causes the closing of the circuits in succession to operate the shift of the gears in regular succession.

14. A gear shift comprising gear-moving members, electrically operated devices controlling the movement of said members to cause a shifting of the gears in progression, a clutch lever, a fixed contact, and a contact movable with the clutch lever but spaced from the fixed contact far enough to permit the normal operation of the clutch lever without bringing the contacts together, said contacts controlling the circuits with a source of electricity and said electrically operated devices.

15. A gear shift comprising gear-moving members, electrically operated devices controlling the movement of said members to cause a shifting of the gears in progression, a clutch lever, a fixed contact, a contact movable with the clutch lever but spaced from the fixed contact far enough to permit the normal operation of the clutch lever without bringing the contacts together, said contacts controlling the circuits with a source of electricity and said electrically operated devices, and a cushioning device movable with the clutch lever and exerting resistance to the movement thereof when the clutch lever is moved far enough to bring the contacts together.

16. A gear shift comprising gear-moving members, electrically operated means controlling the movement of said members, selective devices included in electric circuits with a source of electricity and said electrically operated means, a clutch lever, a pair of contacts operated by the clutch lever, to close the circuits between the source of electricity and said means, and a second pair of contacts controlled by the clutch lever and included in the circuits with the selective devices whereby said means are compelled to operate normally in regular succession.

JUDSON O'DONALD SHEPHERD.